No. 684,220. Patented Oct. 8, 1901.
H. GIBBS.
SPRAY NOZZLE.
(Application filed July 18, 1901.)
(No Model.)
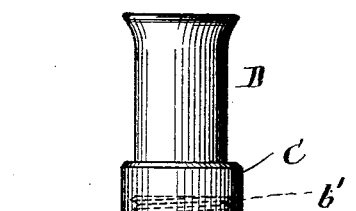
Fig. 1.
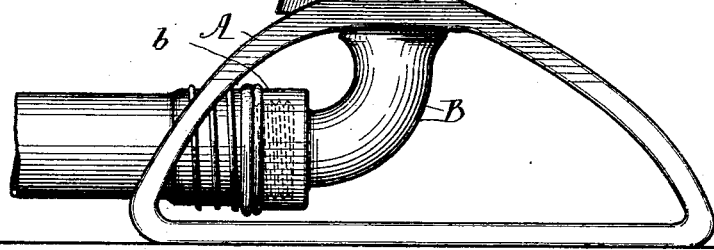
Fig. 2.
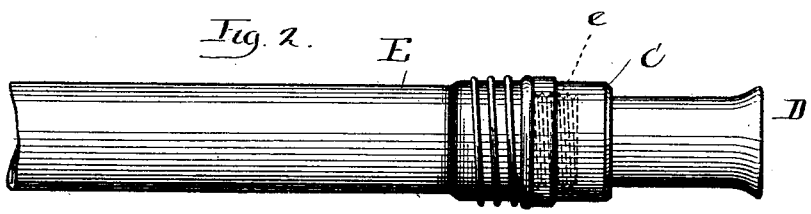
Fig. 3. Fig. 4. Fig. 5.
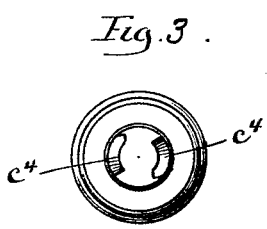
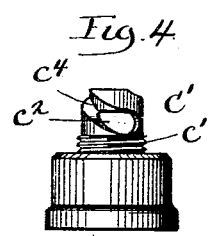
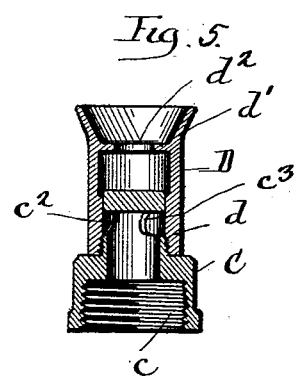
Witnesses:
Fred Gerlach
Alberta Adamick
Inventor:
Henry Gibbs
By Pien & Fisher
his Attorneys.
THE NORRIS PETERS CO., PHOTO-LITHO., WASHINGTON, D. C.

UNITED STATES PATENT OFFICE.

HENRY GIBBS, OF CHICAGO, ILLINOIS, ASSIGNOR TO W. D. ALLEN MANUFACTURING COMPANY, OF SAME PLACE.

SPRAY-NOZZLE.

SPECIFICATION forming part of Letters Patent No. 684,220, dated October 8, 1901.

Application filed July 18, 1901. Serial No. 68,713. (No model.)

*To all whom it may concern:*

Be it known that I, HENRY GIBBS, a resident of Chicago, in the county of Cook, State of Illinois, have invented certain new and useful Improvements in Spray-Nozzles, of which the following is a full, clear, and exact description.

This invention has for its object to provide an improved construction of spray-nozzle that may be readily attached to a lawn-sprinkler or may be detached therefrom and may be connected to an ordinary coupling of a hose, so that the spray-nozzle may be used either in connection with stationary sprinklers or as a nozzle for the end of a hose.

The invention consists in the features of improvement hereinafter described, illustrated in the accompanying drawings, and particularly pointed out in the claim at the end of this specification.

Figure 1 is a view in elevation, showing a lawn-sprinkler having my invention applied thereto. Fig. 2 is a view showing my improved nozzle applied to the end of a hose to be used by hand. Fig. 3 is a detail plan view of the nozzle with the top removed. Fig. 4 is a detail side view of the nozzle with the top removed. Fig. 5 is a view in central vertical section through the nozzle complete.

A designates an ordinary hose-stand, to which is connected a coupling B, having a threaded end $b$, that will be united to the hose, and having an upper threaded end $b'$, to which my improved spray-nozzle will be attached. The spray-nozzle comprises a base-section C and a detachable outer portion D. The base-section C is provided upon its interior with threads $c$ to engage the threaded upper end $b'$ of the coupling B or to engage the threaded end $e$ of a coupling at the end of the hose E. Hence it will be seen that the nozzle can be readily used either in connection with a sprinkler-stand or can be detached therefrom and attached directly to the coupling at the end of the hose when the operator desires to direct the spray by hand. The base C of the spray-nozzle is formed with a reduced chambered extension C', having exterior threads $c'$ to engage a thread $d$ upon the interior of the section D of the nozzle. In the extension C' are formed two openings $c^2$ and $c^3$, from which lead spirally-disposed grooves $c^4$. When the extension is in position within the outer section D of the nozzle, the wall of the section D coming opposite the holes $c^2$ and $c^3$ and spiral channel $c^4$ will cause the water as it passes through these holes and channels to take a spiral course before it enters the chamber at the end of the section D. This chamber is provided with an inwardly-extending flange $d'$, and as the water enters the chamber of the section D and strikes the flange $d'$ with a whirling motion it is caused to pass through the orifice $d^2$ in finely-divided form or spray.

One advantage in forming the spray-nozzle of the sections C and D is that the extension C', with the holes $c^2$ and $c^3$ and channel $c^4$, may be readily cast, and the cost of the nozzle is thus reduced to a minimum. So, also, if any stoppage occurs in the nozzle it can be readily removed by unscrewing the outer section D from the section C.

Having thus described my invention, what I claim as new, and desire to secure by Letters Patent, is—

A spray-nozzle formed of sections C and D, the section C being provided at its base with an interiorly-threaded portion adapted to admit the threaded coupling of a sprinkler or of a hose-pipe and being formed with a threaded extension C' having holes and spiral grooves therein, and an outer section D interiorly threaded to engage the extension C' and having adjacent its end an inwardly-extending flange $d'$ with an orifice therein for passage of water.

HENRY GIBBS.

Witnesses:
ALBERTA ADAMICK,
GEO. P. FISHER, Jr.